United States Patent
Phillips

(10) Patent No.: US 10,972,892 B2
(45) Date of Patent: Apr. 6, 2021

(54) SYSTEMS AND METHODS FOR EMERGENCY NOTIFICATION

(71) Applicant: Gordon Edward Phillips, Toronto (CA)

(72) Inventor: Gordon Edward Phillips, Toronto (CA)

(73) Assignee: Gordon Edward Phillips, Toronto (CA)

( * ) Notice: Subject to any disclaimer, the term of this patent is extended or adjusted under 35 U.S.C. 154(b) by 0 days.

(21) Appl. No.: 16/687,773

(22) Filed: Nov. 19, 2019

(65) Prior Publication Data

US 2020/0196127 A1 Jun. 18, 2020

Related U.S. Application Data

(60) Provisional application No. 62/780,151, filed on Dec. 14, 2018.

(51) Int. Cl.
| | | |
|---|---|---|
| *H04W 4/16* | (2009.01) | |
| *H04W 4/90* | (2018.01) | |
| *H04W 4/029* | (2018.01) | |
| *G01S 19/17* | (2010.01) | |
| *H04W 4/14* | (2009.01) | |
| *H04L 12/58* | (2006.01) | |

(52) U.S. Cl.
CPC ............... *H04W 4/90* (2018.02); *G01S 19/17* (2013.01); *H04L 51/20* (2013.01); *H04W 4/029* (2018.02); *H04W 4/14* (2013.01); *H04W 4/16* (2013.01)

(58) Field of Classification Search
CPC ...................................................... H04W 4/90
See application file for complete search history.

(56) References Cited

U.S. PATENT DOCUMENTS

| | | | |
|---|---|---|---|
| 8,538,374 B1 | 9/2013 | Haimo et al. | |
| 8,624,727 B2 | 1/2014 | Saigh et al. | |
| 8,774,752 B1 | 7/2014 | Akcasu et al. | |
| 8,862,092 B2 | 10/2014 | Reitnour | |
| 9,361,784 B1 | 6/2016 | Alamri | |
| 2004/0152441 A1 | 8/2004 | Wong | |
| 2011/0111728 A1 | 5/2011 | Ferguson et al. | |
| 2014/0057590 A1 | 2/2014 | Romero | |
| 2014/0143729 A1 | 5/2014 | Myers et al. | |
| 2014/0162590 A1 | 6/2014 | DiPerna et al. | |
| 2015/0065082 A1* | 3/2015 | Sehgal | G08B 25/016 455/404.2 |
| 2018/0332162 A1* | 11/2018 | Schutter | G08B 25/008 |
| 2018/0357887 A1* | 12/2018 | Geyer | G08B 25/016 |
| 2020/0349829 A1* | 11/2020 | Larsen | H04W 4/029 |

FOREIGN PATENT DOCUMENTS

WO 2016137596 A1 9/2016

OTHER PUBLICATIONS

International Search Report from corresponding international application No. PCT/CA20219/051645.

* cited by examiner

*Primary Examiner* — Michael T Vu
(74) *Attorney, Agent, or Firm* — Stratford Managers Corporation

(57) ABSTRACT

A system and method for emergency notification comprising a notification module that transmits a message to a pre-established contact when one or more conditions are met.

12 Claims, 8 Drawing Sheets

SYSTEMS AND METHODS FOR EMERGENCY NOTIFICATION

This application claims the benefit of U.S. Provisional Patent Application No. 62/780,151 filed Dec. 14, 2018, which is hereby incorporated by reference in its entirety.

BACKGROUND

People can often find themselves in compromising and/or dangerous situations. In these situations, an individual may need to covertly contact a third party in order to seek assistance. However, at times, it may be difficult or impossible to contact that third party without drawing attention to such contact.

Therefore, there is a need to provide a solution to the above issue.

BRIEF SUMMARY

A system and method for emergency notification comprising a notification module that transmits a message to a pre-established contact in an event that one or more conditions have or have not been met.

In another embodiment, the message is transmitted by one or more of a text message, an email and a messaging application.

In another embodiment, the notification module is located on a mobile device.

In another embodiment, a tracker is coupled to said mobile device.

In another embodiment, the pre-established contact is one of more of a friend, a family member, a third-party, or a monitoring service.

In another embodiment, the contact is located at a remote location away from a user.

In another embodiment, the message is sent at a pre-established time.

In another embodiment, the message is manually sent by a user.

In another embodiment, the message is automatically sent to one or more of the pre-established contacts.

In another embodiment, the message includes a preset message.

In another embodiment, the preset message includes one or more of a description, photos, videos and coordinates.

In another embodiment, one or more photos are taken by a mobile device are performed in a silent mode.

In another embodiment, one or more videos are taken by a mobile device are performed in a silent mode.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
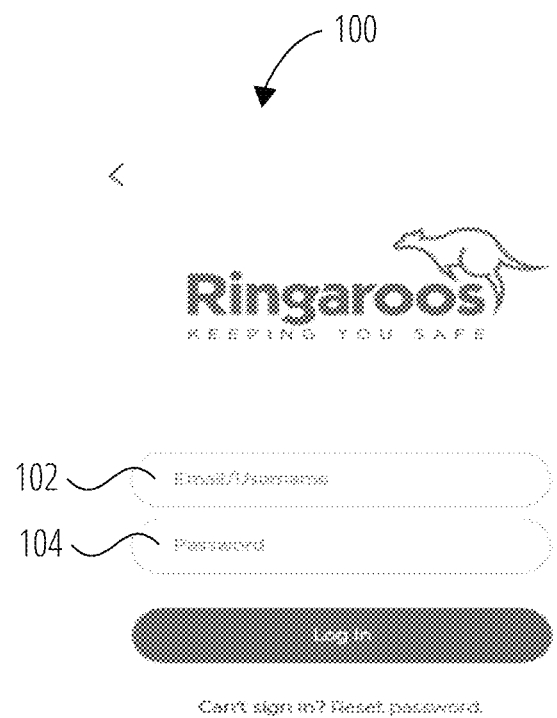
FIG. 1 illustrates a software application 100 in accordance with one embodiment.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Certain aspects of the present invention and their embodiments may provide solutions to these or other challenges. The proposed solution is to provide systems and methods to notify an intermediary of an emergency or otherwise unwanted situation involving a person whereby the intermediary may then contact appropriate authorities, third parties, etc. in an effort to resolve that situation. This solution will allow an individual to engage in social activities with the knowledge that should such social activities become or develop into a compromising or emergency type of situation the situation can be resolved safely.

There are, proposed therein, various embodiments which address one or more of the issues disclosed herein.

In general, the present invention provides a mobile application that can be housed on a user's mobile device or similar piece of hardware. The application allows for the triggering of certain types of events that allows the user to engage with the user's mobile device, e.g. a fake phone call, a fake incoming text message, alarm, etc. These events can all be triggered manually or pre-scheduled by the user.

Once triggered, and the user acknowledges, the application may automatically turn on the outward facing camera so that the user can see where the camera is aimed to properly point the camera in direction of appropriate subject. The camera may then automatically take pictures or a video clip of subject in a silent or stealth mode, i.e. no sound or flash. The application may then transmit a combination of a message, photos, videos and location to a previously established recipients set by the user an alarm message which may include one or more of the following: any of the taken photographs, any of the taken videos, a pre-drafted message and the user's location. The alarm message may be by any process available, include text message or email.

The recipient of the alarm message may be a personal emergency contact of the user, or local emergency service, law enforcement or a contact center. The mobile application is a computer product for emergency notification comprising computer readable storage medium having computer readable instructions stored thereon for execution by a processor, causing the processor to perform the method set about above.

Certain embodiments may provide one or more of the following technical advantages. The proposed solution is to provide a software application housed on an individual's mobile communication device which can be programmed to transmit a message to a pre-established contact, otherwise referred to as an intermediary, in the event that certain conditions have been or have been not met.

In some embodiments, a tracker may be coupled to the mobile device to provide the user's location to the intermediary.

In some embodiments, a system utilizes a mobile communication device such as a cellular phone. The mobile communication device may also be known as user equipment or a wireless device. The intermediary may be a friend, family member, third-party, monitoring service, etc. the intermediary is located at a remote location away from the individual utilizing the system.

The system may send an alarm message to the intermediary at either a pre-established time or manually by the individual. When the intermediary receives the alarm message, the intermediary may then act upon that message, by either taking action themselves or contacting another third party, such as law enforcement, to inform that third party of the situation.

The alarm message may be any type of communication message available such as a text message, email message or any other form of electronic communication. The alarm message may include a preset message, static information regarding the individual such as the individual's description, date of birth, mobile phone number, photograph, etc. The alarm message may further include dynamic information regarding the situation such as photographs and videos of the situation. For example, if the situation involves a potential threatening person, the individual's cellular phone may engage its photographs and video capabilities in order to take one or more photographs and/or videos which can then be included in the alarm message. In some embodiments, the engagement of the photograph and video capability can be performed in a silent, or stealth, mode. This allows for the taking of the photographs and or video without drawing attention to such activities.

In some embodiments, the alarm message may be sent at the pre-established time. For example, an individual is planning on a first face-to-face meeting with another person with whom she met over an online dating website. The face-to-face meeting is scheduled to begin at a specific time. The alarm message may be set to be sent to one of the individuals contacts thirty minutes after the first face-to-face meeting was scheduled to begin. In the event the face-to-face meeting is digressing into a compromising situation, the individual may allow the alarm message to be sent in order to notify the intermediary that assistance is needed. However, the individual may disengage the alarm message at any time prior to it being sent in the event the face-to-face meeting is progressing in a positive manner.

In some embodiments, the alarm message may be sent while utilizing a dummy phone call procedure. This procedure may ring the individual's communication device to simulate a phone call. When the individual answers the dummy phone call, the individual may send the pre-established alarm message to one of the individuals contacts. The use of the photographs and video capabilities may be engaged at this time.

FIG. 1 depicts an operational example of the notification module where a user utilizes a software application that performs at least one embodiment of the systems and methods of the present invention. An existing user will be able to access their account by inputting their user identification 102 and user password 104.

Figure 2:
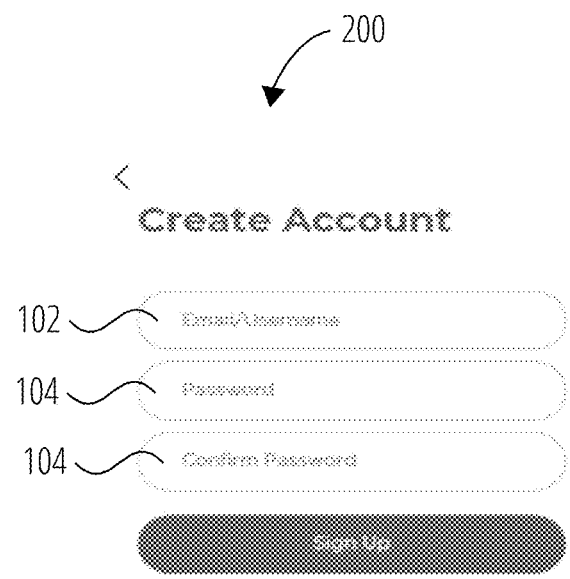
FIG. 2 illustrates a create account 200 in accordance with one embodiment.

As depicted in FIG. 2, in the event the user does not have an account with software, the user will be able to create an account by selecting a user identification 102 and user password 104.

Figure 3:
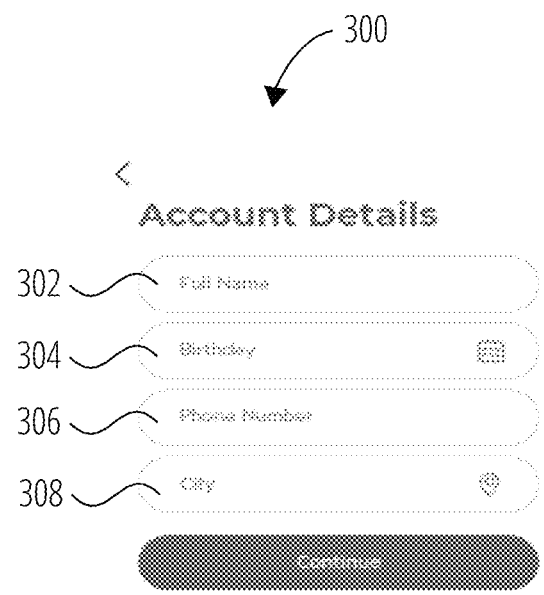
FIG. 3 illustrates an account details 300 in accordance with one embodiment.

FIG. 3 depicts a portion of the account set up procedure, where various static user information is obtained. Examples of static user information include, but are not limited to, the user's name 302, user's birthday 304, user's phone number 306 and user's city of residence 308. This information may be included in any alarm message and can be used to help identify the user to a third party who is responding to the alarm message.

Figure 4:
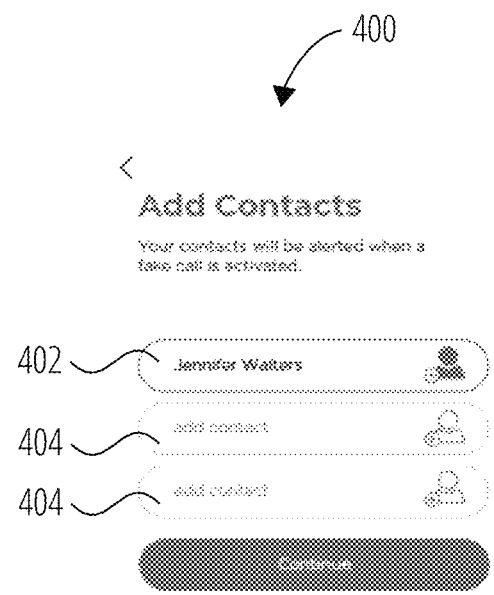
FIG. 4 illustrates an add contacts 400 in accordance with one embodiment.

FIG. 4 depicts a portion of the account set up procedure, where the user may be able to add one or more contacts to the account. These contacts will be the intermediaries upon which will be contacted in the event an alarm message is sent out. In this example, the user has an added contact 402 and the ability to add one or more additional contacts.

Figure 5:
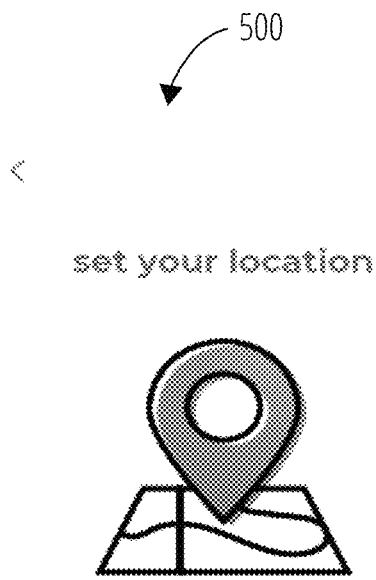
FIG. 5 illustrates a location position system activation 500 in accordance with one embodiment.

FIG. 5 depicts an additionally feature where the user may activate a location position system, such as a GPS system. This will allow the inventive system to be able to include the user's location in the event a preset message is sent out.

Figure 6:
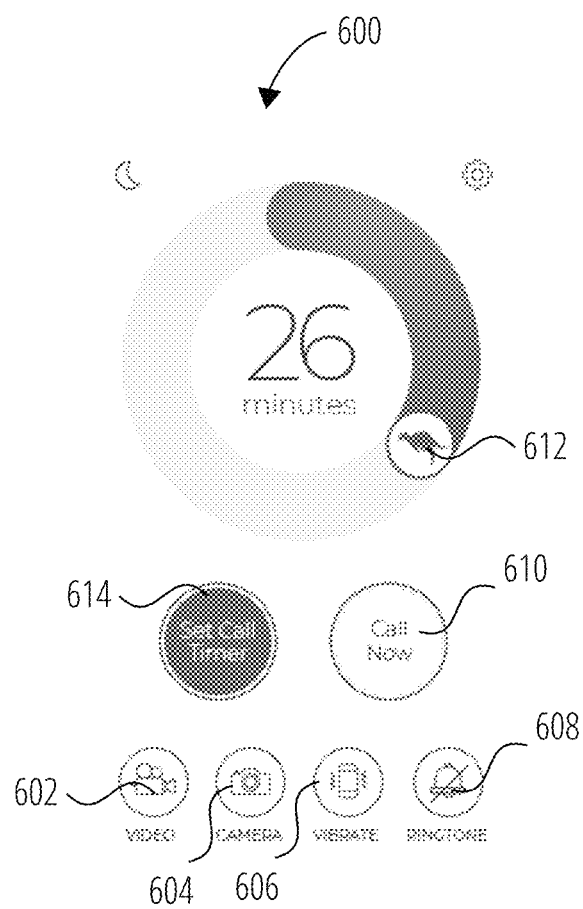
FIG. 6 illustrates a dummy call 600 in accordance with one embodiment.

FIG. 6 depicts the ability for the user to generate a dummy call 600. The dummy call 600 can include various options, such as, but not limited to, the use of the mobile device's video 602 and/or photograph 604 capabilities, and the use of a ringtone notification 608 and vibration notification 606 features. Furthermore, the system may allow the user to manually receive a call at any time or set a pre-established time for the dummy call to be made at some time in the future. The dummy call 600 can be immediately activated through the call now function 610 or alternatively, can be activated in the set a predetermined timeframe 612 through the set call timer 614. In this example, the dummy call 600 is set to be made in twenty-six minutes with the mobile device's video 602, photograph 604 and vibration notification 606 setting activated for the incoming dummy call 600 and the mobile device's ringtone notification 608 setting deactivated for the incoming dummy call 600.

Figure 7:
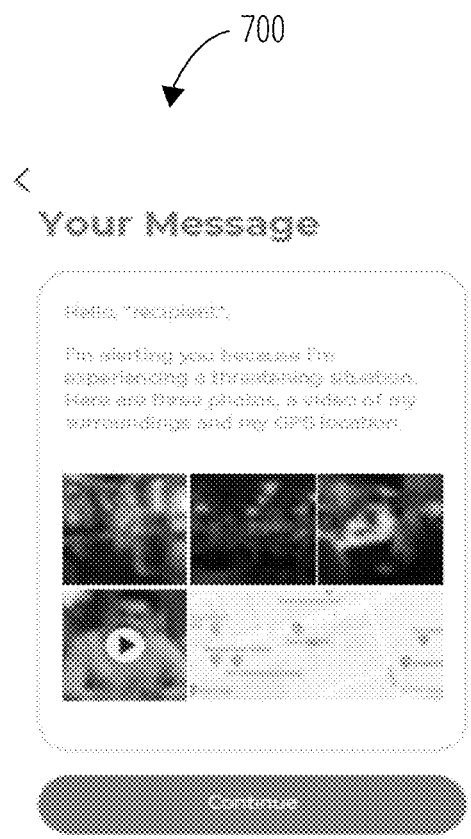
FIG. 7 illustrates a pre-establish alarm message 700 in accordance with one embodiment.

FIG. 7 depicts the ability for the user to pre-establish the alarm message.

Figure 8:
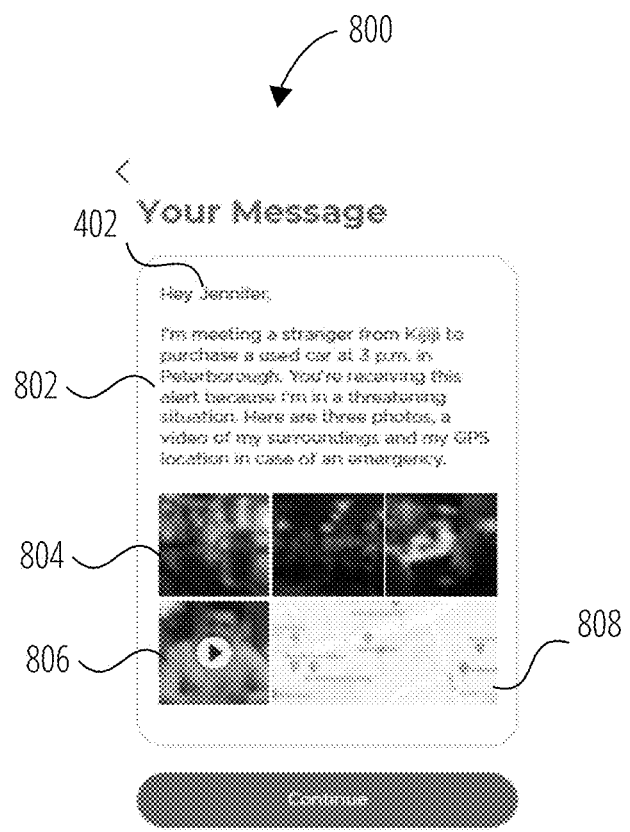
FIG. 8 illustrates a create a message 800 in accordance with one embodiment.

FIG. 8 depicts the ability for the user to create a message to be sent to one or more added contacts that provides one or more of a description 802, photos 804, videos 806 and coordinates 808 for a specific situation. In this example, the user intends on meeting a stranger in order to purchase the stranger's car. The user's created message includes a description 802 to an added contact 402, a set of photos 804, a video and coordinates 808 from the area of the user's location.

Generally, all terms used herein are to be interpreted according to their ordinary meaning in the relevant technical field, was a different meaning is clearly given and/or is implied from the context in which it is used. All references to an element, apparatus, component, means, step, etc. are to be interpreted openly as referring to at least one instance of the element, apparatus, component, means, step, etc., unless explicitly stated otherwise the steps of any methods disclosed herein do not have to be performed in the exact order disclosed, unless a step is explicitly described as following or proceeding another step and/or where it is implicit that a step must follow or proceed another step. Any feature of any embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU). Computers suitable for the execution of a computer program include, by way of example, general or special purpose microprocessors or both, or any other kind of central processing unit. Generally, a central processing unit receives instructions and data from a read-only memory or a random-access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive. Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

What is claimed is:

1. An emergency notification mobile application system executed on a processor of a mobile device comprising:
    a notification module executed on a processor of a mobile device capable of transmitting an alarm message to a pre-established contact, when a user responds to a pre-scheduled event;
    said pre-scheduled event includes one or more from a group comprising a fake phone call, a fake incoming text message and an alarm, wherein said user response is directed towards said pre-scheduled event;
    said alarm message is transmitted by one or more from the group comprising a text message, an email, and a messaging application, wherein said alarm message includes a preset message;
    said preset message includes one or more from the group comprising a description, photos, videos and coordinates; and
    said pre-established contact is selected from the group consisting of one of more of a friend, a family member, a third-party, a monitoring service, a personal emergency contact and a local emergency service.

2. The system of claim 1 further comprising transmitting an alarm message to a pre-established contact when a user fails to respond to a pre-scheduled event.

3. The system of claim 1 wherein a tracker is coupled to said mobile device.

4. The system of claim 1 wherein said contact is located at a remote location away from a user.

5. The system of claim 1 wherein one or more photos are taken by a mobile device are performed in a silent mode.

6. The system of claim 1 wherein one or more videos are taken by a mobile device are performed in a silent mode.

7. A method for an emergency notification mobile application executed on a processor of a mobile device, the method comprising:
    transmitting from a mobile device an alarm message to a pre-established contact when a user responds to a pre-scheduled event;
    said pre-scheduled event including one or more from a group comprising a fake phone call, a fake incoming text message and an alarm, wherein said user response is directed towards said pre-scheduled event;
    transmitting one or more said alarm messages from the group comprising a text message, an email, and a messaging application, wherein said alarm message includes a preset message;
    said preset message including one or more from the group comprising a description, photos, videos and coordinates; and
    selecting said pre-established contact from the group consisting of one of more of a friend, a family member, a third-party, a monitoring service, a personal emergency contact and a local emergency service.

8. The method of claim 7 further comprising transmitting a message to a pre-established contact when one or more predetermined conditions are not met.

9. The method of claim 7 wherein said alarm message is sent at a pre-established time.

10. The method of claim 7 wherein said alarm message is automatically sent to one or more of said pre-established contacts.

11. The method of claim 7 wherein one or more photos are taken by a mobile device are performed in a silent mode.

12. The method of claim 7 wherein one or more videos are taken by a mobile device are performed in a silent mode.

* * * * *